United States Patent [19]

Brauer et al.

[11] E Patent Number: Re. 33,761

[45] Reissued Date of Patent: Dec. 3, 1991

[54] RICINOLEATE PLASTICIZERS FOR POLYURETHANE COMPOSITIONS

[75] Inventors: Melvin Brauer, East Brunswick; William J. Downey, Linden; Frank C. Naughton, Mountainside, all of N.J.

[73] Assignee: CasChem, Inc., Bayonne, N.J.

[21] Appl. No.: 428,685

[22] Filed: Oct. 30, 1989

Related U.S. Patent Documents

Reissue of:

[64] Patent No.: 4,666,969
Issued: May 19, 1987
Appl. No.: 837,555
Filed: Mar. 3, 1986

U.S. Applications:

[63] Continuation-in-part of Ser. No. 713,379, Mar. 19, 1985, abandoned.

[51] Int. Cl.[5] ..... C08K 5/10; C08L 75/04

[52] U.S. Cl. ..... 524/310; 524/284; 524/589; 524/590; 524/773; 523/173

[58] Field of Search ..... 524/310, 284, 589, 590, 524/773; 523/173

[56] References Cited

U.S. PATENT DOCUMENTS

| | | | |
|---|---|---|---|
| Re. 30,321 | 7/1980 | Brauer et al. | 260/18 TN |
| 3,047,520 | 7/1962 | Fiel | 260/18 |
| 3,102,875 | 9/1963 | Heiss | 260/77.5 |
| 3,136,732 | 6/1964 | Kaestner et al. | 260/33.6 |
| 3,338,861 | 8/1967 | Mastin et al. | 260/33.6 |
| 3,390,119 | 6/1968 | Alexander et al. | 524/871 |
| 3,441,530 | 4/1969 | Bauer et al. | 260/28.5 |
| 3,714,110 | 1/1973 | Verdol et al. | 260/33.6 AQ |
| 3,747,037 | 7/1973 | Earing | 336/96 |
| 3,748,294 | 7/1973 | Kershow et al. | 260/22 |
| 3,801,532 | 4/1974 | Olstowski | 260/33.8 |
| 3,869,421 | 3/1975 | Sapp et al. | 260/33.6 AQ |
| 3,883,465 | 5/1975 | Olstowski | 260/31.2 |
| 3,886,102 | 5/1975 | Olstowski | 260/18 TN |
| 3,886,111 | 5/1975 | Yoshimura et al. | 260/31.2 N |
| 3,933,725 | 1/1976 | Dearlove et al. | 524/848 |
| 3,963,656 | 6/1976 | Meisert et al. | 260/18 TN |
| 3,980,606 | 9/1976 | Werner | 260/31.8 R |
| 4,001,165 | 1/1977 | Olstowski | 260/33.6 |
| 4,001,166 | 1/1977 | Olstowski | 260/33.6 |
| 4,067,834 | 1/1978 | Olstowski | 260/18 TN |
| 4,076,660 | 2/1978 | Olstowski et al. | 260/9 |
| 4,102,716 | 7/1978 | Groves et al. | 524/871 |
| 4,122,058 | 10/1978 | Olstowski | 524/871 |
| 4,168,258 | 9/1979 | Brauer et al. | 260/33.6 UB |
| 4,168,363 | 9/1979 | Boetchler | 528/48 |
| 4,171,998 | 10/1979 | Brauer et al. | 156/48 |
| 4,176,239 | 11/1979 | Brauer et al. | 174/23 C |
| 4,230,168 | 10/1980 | Kaneda et al. | 152/310 |
| 4,231,986 | 11/1980 | Brauer et al. | 264/272 |
| 4,264,486 | 4/1981 | McLaughlin | 260/33.6 UB |
| 4,281,210 | 7/1981 | Brauer et al. | 174/23 C |
| 4,329,442 | 5/1982 | Pokorney | 528/49 |
| 4,349,640 | 9/1982 | Keeney et al. | 524/773 |
| 4,355,130 | 10/1982 | Heinze | 524/491 |
| 4,373,057 | 2/1983 | Hammond | 524/700 |
| 4,375,521 | 5/1983 | Arnold | 523/173 |
| 4,396,053 | 8/1983 | Davis et al. | 524/871 |
| 4,533,598 | 8/1985 | Downey et al. | 524/773 |
| 4,596,743 | 6/1986 | Brauer et al. | 428/380 |
| 4,849,579 | 7/1989 | Chapin et al. | 174/74 R |
| 4,876,303 | 10/1989 | Chapin et al. | 524/296 |

FOREIGN PATENT DOCUMENTS

| | | |
|---|---|---|
| 1074486 | 3/1980 | Canada . |
| 1117682 | 2/1982 | Canada . |
| 130089 | 1/1985 | European Pat. Off. . |
| WO86/00166 | 1/1986 | World Int. Prop. O. . |

*Primary Examiner*—Allan M. Lieberman
*Attorney, Agent, or Firm*—Pennie & Edmonds

[57] ABSTRACT

A plasticized polyurethane gel system comprising the reaction product of an isocyanate compound and a polyol in the presence of a ricinoleate plasticizer compound having a total solubility parameter of [between about 8.3 and 8.9 or] between about 9.1 and 9.7 *to 10.1*.

14 Claims, No Drawings

RICINOLEATE PLASTICIZERS FOR POLYURETHANE COMPOSITIONS

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of application Ser. No. 713,379, filed Mar. 19, 1985, now abandoned.

TECHNICAL FIELD

The invention relates to polyurethane gels which contain novel plasticizers and which may be formulated as a grease-compatible, non-spewing material for use in reclaiming, encapsulating or sealing electrical cables or devices.

BACKGROUND ART

It is well-known in the art to extend polymers such as polyurethanes. This extended material will then be designated for use in a desired area of utility. Typical of such extending agents is mineral oil, such mineral oil extended polyurethanes being disclosed in U.S. Pat. Nos. 3,714,110 and 3,747,037.

It has also been determined that the material oil extended polyurethane is useful in the reclamation and protection of insulated electric devices. Such devices may, for example, be underground telephone cables which are exposed to fluid contaminants. These contaminants can seriously impair the electrical and mechanical properties of such a device. The protectant material is pumped into the cable to remove water that has penetrated into interior free spaces. The material is pumped at low viscosity to achieve an appropriate distribution and it then cures in place to a high viscosity. The curved material acts as a hydrophobic barrier to subsequent water penetration. In another application, this material may be utilized as an encapsulant for sealing sections of cable. In this manner, the material serves to prevent the penetration of fluid contaminants from the outset.

A mineral oil extended polyurethane which is useful for this purpose is disclosed in U.S. Pat. No. Re. 30,321. That patent defines a cured, crosslinked, mineral oil extended polyurethane prepared from specific polyurethanes and coupling agents, the latter being necessary to compatibilize the mineral oil with the crosslinking urethane elastomer.

Disadvantages of these material oil extended polyurethane systems were encountered, however, and these are described in U.S. Pat. No. 4,168,258. There it was stated that, with the earlier mineral oil extended polyurethanes, the mineral oil would tend to migrate toward any grease present in the cable or device in order to be reclaimed or encapsulated. This grease is encountered more frequently in newer insulated electrical devices. This migration was shown to cause the formation of an oily film at the grease interface which tended to decrease the reclamation and encapsulant effectiveness of the polyurethane. In order to avoid these difficulties, the patent specifically defined a polyurethane-mineral oil-coupling agent formulation relying on the presence of a polydiene moiety in the polyurethane structure.

Mineral oil remained as the extending agent, with the stated preference for including some aromatic carbon content therein.

It is also known that previous polyurethane compositions have been difficult to re-enter after they have fully cured primarily due to their high cast strength or aging hardness, as well as due to their opaque or cloudy color. The high cast strength and hardness of these prior art polyurethanes contribute to the difficulty of cutting through or removing cured material from a repaired area. In some applications, the opaque color makes it difficult for the operator to establish the exact location to reenter a repair, and thus, clear soft polyurethane gels are preferred.

With either the clear or opaque products, the ability of these polyurethanes to be easily reentered is important in the repair or encapsulation of insulated electrical or telephone cables when a second splice or connection must be made in the same area as the previous repair or encapsulation. There are also situations where the initial repair or encapsulation is improperly made and has to be re-done. For these reasons, the primary concern regarding the physical properties of these gels is to provide a polyurethane having a relatively low tear strength and hardness. Furthermore, it is highly desirable for these materials to maintain these properties over time.

A vegetable oil extended polyurethane which satisfies some of these requirements and provides an initially reenterable gel is disclosed in U.S. Pat. No. 4,375,521. There, vegetable oil extended polyurethanes of a three component system comprising a specific polyurethane, vegetable oil, and specific extending agent is disclosed for use in reclamation and encapsulation applications. However, these vegetable oil extended formulations usually provide opaque gels, and, more importantly, tend to cause cracking or stressing of the polycarbonate connectors which are usually present in the cable unit being reclaimed, encapsulated, or repaired. Furthermore, some of these gel formulations age harden over time to make reenterability difficult.

In U.S. Pat. No. 4,355,130, a polyalphaolefin extended polyurethane is disclosed which resolves the stress cracking problem. Such polyalphaolefin extended polyurethanes comprise specific polyurethanes; a specific polyalphaolefin extender, and, for reclamation and encapsulation purposes, specific ester coupling agents. The coupling agent is required to compatibilize the formulation so that there will be no "spewing" of extender from the cured material.

DISCLOSURE OF THE INVENTION

It is, therefore, an object of the present invention to provide an extended polyurethane gel system having improved compatibility with cable greases. These compositions also have utility as cable reclamation compounds and fiber-optic splice encapsulations for the telecommunications industry.

It is a further object to provide polyurethane gel formulations which are defined in accordance with specific end use applications.

It has now been found that by utilizing the plasticizers of the present invention as the extending agents for polyurethane gels, the resulting systems are well suited for a number of end use applications including electric or telecommunication cable reclamation and encapsulation or as general polyurethane elastomers. Such plasticized polyurethane gels generally comprise a specified polyurethane component and a plasticizer compound having a total solubility parameter of [between about 8.3 and 8.9 or] between about 9.1 and 9.7.

The polyurethane gels of the present invention are characterized as having excellent compatibility of the components, a broad viscosity range, good electrical properties, and the absence of cracking or stressing tendencies on polycarbonate connectors. It is particularly in the area of compatibility of the components and the electrical properties of the compositions that these polyurethanes exhibit significant improvements over prior art mineral oil extended systems.

When used in the area of reclamation and encapsulation, these plasticized polyurethane gels provide excellent performance characteristics. They possess the low viscosities necessary for initial introduction into the cable and the ability to retain these low viscosities for a period of time sufficient to enable them to fill the length of the free spaces in the cable or form a completely encapsulating cover. They also possess the ability to displace and/or repel fluid contaminants and cure in place to form a gel-like urethane structure which neither spews forth nor exudes the plasticizer. This gel structure has sufficient rigidity to provide an excellent protective barrier, yet can be readily cut and removed if re-entry is desired. The polyurethane gels are non-corrosive to copper wire and compatible with the conventionally used polycarbonate connectors and other polymeric materials utilized in cable manufacture. The system is also convenient to handle and apply in the field.

The polyurethane which is used in these formulations is generally prepared by reacting approximately stoichiometric amounts of an isocyanate compound with a polyol. The plasticizer can be added to either component before they are reacted.

In a preferred embodiment, the isocyanate component is a polyisocyanate prepolymer which is in turn prepared by reacting an excess of an isocyanate compound with a polyol in a manner well known in the art. A portion of the plasticizer is added to the polyisocyanate prepolymer, and the mixture is then reacted with a polyol containing the remaining portion of the plasticizer to form the gels.

The isocyanate compounds of the invention which can be used for the preparation of the polyisocyanate prepolymer or direct reaction with the polyol to form the polyurethane contemplate any organic polyisocyanate having 2 or more NCO groups per molecule and no other substituents capable of reacting with the hydroxyl groups of the polyol. This would include aliphatic polyisocyanates, cycloaliphatic polyisocyanates, or aromatic polyisocyanates. Typical of such polyisocyanate compounds are 3-isocyanatomethyl-3,5,5-trimethylcyclohexyl isocyanate (IPDI), toluene diisocyanate (TDI), 4,4'-diphenylmethanediisocyanate (MDI), polymethylene polyphenylisocyanate, 1,5 naphthalene diisocyanate, phenylene diisocyanates, 4,4'-methylene bis(-cyclohexylisocyanate), hexamethylene diisocyanate, biuret of hexamethylene diisocyanate, 2,2,4-trimethylhexamethylene diisocyanate and combinations thereof, as well as related aromatic, aliphatic, and cycloaliphatic polyisocyanates which may be substituted with other organic or inorganic groups that do not adversely affect the course of the reaction.

The term "aliphatic", as used herein, includes those carbon chains which are substantially non-aromatic in nature. They may be saturated or unsaturated, unbranched, branched, or cyclic in configuration and may contain substituents which do not adversely affect migration. Such aliphatic isocyanates generally have an equivalent weight of from 60 to 160 and a viscosity of 1 to 1500 centipoises at 25° C. Exemplary of the liquid long chain aliphatic polyisocyanates are dodecyl diisocyanate, tridecyl diisocyanate, and the like. Polymethylene polyphenyl isocyanate is commercially available from Mobay Chemicals under the trademark Mondur MRS. Two preferred compounds, Mondur MRS and MRS and MRS-10, are dark-brown liquids having a slight aromatic ordor. Specifically Mondur MRS has an NCO content of 31.5%, an amine equivalent of 133, a viscosity of 200 mPa-S at 25° C., and a density of 1.24 g/cc, while Mondur MRS-10 has an NCO content of 31.9%, an amine equivalent of 132, a viscosity of 80 mPa-s at 25° C. and a density of approximately 1.24 g/cc. Diphenylene methane diisocyanates are commercially available in a stabilized liquid form from Upjohn under the trademark Isonate 143L or from Mobay under the trademark Mondur CD. Specifically, Isonate 143-L is a light yellow, modified diphenyl-methane diisocyanate having an NCO content of 29.2 weight percent, an isocyanate equivalency of 144, an acidity value of less than 0.030 and a viscosity of 35 cps at 25° C., while Mondur CD is a light-yellow modified 4,4'diphenylmethane diisocyanate having an NCO content of 29.3 weight percent and a viscosity of less than 100 mPa-s at 25° C. Various polyarylene polyisocyanates are commercially available from Upjohn under the trademark PAPI, of which PAPI 94 is typical. PAPI 94 is a polymeric methylene diisocyanate containing approximately 98% of 4,4'isomer with the remaining 2% being the 2,4' isomer. PAPI 94 has an NCO content of approximately 2.

Suitable polyols for reaction with the organic polyisocyanates include castor oil, polyether polyols, polyester polyols, hydroxyl bearing homopolymers of dienes, hydroxyl bearing copolymers of dienes, amine based polyols, polymeric polyols, and combinations thereof. Such polyols generally have an equivalent weight of from 30 to 6000 and a viscosity of from 1 to 20,000 centipoises at 25° to 60° C. The higher equivalent weight materials, i.e., those having equivalent weights above about 250, are generally preferred.

One polyol which may be used in the preparation of these plasticized polyurethane gels is castor oil, a compound primarily composed of ricinolein, which is a glyceride of ricinoleic acid. A typical castor oil comprises a mixture of about 70% pure glyceryl triricinoleate and about 30% glyceryl diricinoleate-monoleate or monolinoleate and is available from CasChem, Inc. as DB Oil.

Suitable polyether polyols include aliphatic alkylene glycol polymers having an alkylene unit composed of at least two carbon atoms. These aliphatic alkylene glycol polymers are exemplified by polyoxypropylene glycol and polytetramethylene ether glycol. Also, trifunctional compounds exemplified by the reaction product of trimethylol propane and propylene oxide may be employed. A typical polyether polyol is available from Union Carbide under the designation Niax PPG-425. Specifically, Niax PPG-425, a copolymer of a conventional polyol and a vinyl monomer, has an average hydroxyl number of 263, an acid number of 0.05, and a viscosity of 80 centistokes at 25° C.

The general term polyether polyols also includes polymers which are often referred to as amine based polyols or polymeric polyols. Typical amine based polyols include sucrose-amine polyols such as Niax BDE-400 or FAF-529 or amine polyols such as Niax LA-475 or LA-700, all of which are available from Union Carbide. As one skilled in the art would known, there are no free amino hydrogens in any of these compounds.

The hydroxyl bearing homopolymers of dienes or hydroxyl bearing copolymers of dienes are prepared from dienes which include unsubstituted, 2-substituted or 2,3-disubstituted 1,3-dienes of up to about 12 carbon atoms. Preferably, the diene has up to about 6 carbon atoms and the substituents in the 2- and/or 3-position may be hydrogen, alkyl groups having about 1 to about 4 carbon atoms, substituted aryl, unsubstituted aryl, halogen, and the like. Typical of such dienes are 1,3-butadiene, isoprene, chloroprene, 2-cyano-1,3-butadiene, 2,3-dimethyl-1,2-butadiene, and the like. The preferred dienes are 1,3-butadiene and isoprene. A hydroxyl terminated polybutadiene is available from ARCO Chemicals under the designation Poly-BD R-45HT. Specifically, Poly-BD R-45HT has a molecular weight of about 2800, a degree of polymerization of 50, a hydroxyl functionality of about 2.4 to 2.6, a hydroxyl number of 46.6, a hydroxyl value of 0.83, and an iodine number of 398.

A wide variety of aromatic and aliphatic diamines may form part of the amine-based polyols, such as N,N-bis(2-hydroxypropyl)aniline and N,N,N',N'-tetrakis(2-hydroxypropyl)ethylenediamine. A typical amine-based polyol is available from Upjohn under the designation Isonol 100, an amber colored liquid polyol having a molecular weight of 209, a hydroxyl number of 534, an equivalent weight of 104.5, an average functionality of 2.0 and a viscosity of 1450 at 50° C. A typical amine-based polyol is available from BASF under the designation Quadrol, a viscous liquid polyol with four hydroxyl groups, two tertiary nitrogen atoms, a hydroxyl number of 770 and a viscosity of 53,000 cps at 25° C.

Polymeric polyols can be described as conventional polyols with a stable dispersion of vinyl polymers. For example, U.S. Pat. No. 4,104,236 discloses such polyols with acrylonitrile-styrene polymers; a further typical polyol is available from Union Carbide under the designation Niax 24–32. Specifically, Niax 24–32, a copolymer of a conventional polyol and a vinyl monomer, has an average hydroxyl number of 32 and a viscosity of 1300 centipoise at 25° C.

The plasticizer compounds which can be used in this invention include any compound or mixture of compounds having a total solubility parameter of [between about 8.3 and 8.9 or] between about 9.1 and 9.7. Compounds having solubility parameters higher than 9.7 are too volatile for use in gel formulations[, while those having solubility parameters less than 8.3 are not compatible with the polyurethane reaction product].

Suitable plasticizer components are esters such as the phthalates or adipates having between about 4 and 13 carbon atoms, since these compounds possess solubility parameters falling within the above-described critical ranges. Certain synthetic ricinoleate compounds, such as glyceryl tri(acetyl ricinoleate) and similar compounds which have solubility parameters within the above-disclosed ranges, are also-useful and, in most cases, preferred due to their greater compatibility with a wide range of cable fillers or greases which are typically encountered in the reclamation or encapsulation of telecommunication or electrical cable.

Specific preferred compounds which can be used as plasticizers in accordance with the invention are listed below in Table I.

TABLE 1

| PLASTICIZER COMPOUNDS | |
|---|---|
| Compound | Solubility Parameter |
| [ditridecyl adipate] | [8.9] |
| diundecyl phthalate | [9.12] *9.4* |
| diisodecyl phthalate | [9.15] *9.5* |
| glyceryl tri(acetyl ricinoleate) | 9.3 |
| dibutyl phthalate | [9.7] *10.1* |

The specific solubility parameter ranges have been determined by weight gain and conductor pull out tests as shown by the examples. Specifically, compounds having a total solubility parameter which results in a weight loss or in which a conductor cable can be easily pulled out are not satisfactory for use in this invention.

Also, one or more of the above-identified plasticizers can be used in combination without departing from the teachings of the invention provided that the overall solubility remains in the critical range.

The solubility parameters of the plasticizer compounds are determined as described in the article entitled "A method for Estimating Both the Solubility Parameters and Molar Volumes of Liquids" by R. F. Fedors, POLYMER ENGINEERING SCIENCE, Vol. 14, No. 2, February, 1974, pp. 147–154. This article is expressly incorporated by reference in this application.

As noted in the above-mentioned article, the total solubility parameter for a liquid at 25° C. can be calculated from equation 28 as follows:

$$\gamma = \sqrt{\frac{\sum_i \Delta e_i}{\sum_i \Delta v_i}}$$

wherein $e_i$ and $v_i$ are the additive atomic and group contribution for the energy of vaporization and molar volume, respectively. Based upon a vast amount of data on simple liquids, these contributions applicable at a temperature of 25° C. have been compiled in Table 5 of the article. Thus, in order to calculate the total solubility parameter for any liquid compound, all one needs to know is the chemical structure of the compound. Therefore, the term "total solubility parameter" as used in this application is intended to mean the solubility parameter of the compound at 25° C., which is calculated from the experimental energy of vaporization and molar volume values given in Table 5 of the Fedors article. The values which appear in Table I of this application are the total solubility parameter for those compounds calculated in the manner previously described.

With respect to the weight change testing, there are different types of greases which may be encountered in telecommunication cable. The most common is FLEXGEL cable filter. FLEXGEL is a registered trademark of the Western Electric Co. Inc. for their cable filling compounds for waterproofing electrical cable. Other cables may contain petroleum jelly (PJ) or polyethylene modified petroleum jelly (PEPJ). PEPJ is a higher melting point material than PJ. It should be noted that the ricinoleates have a wider range of compatibility with all types of cable fillers than the other plasticizer compounds.

With respect to the use of those plasticizer compounds in the formulations of the present invention, it should be noted that those compounds having a solubility parameter between about 9.1 and 9.7 provide clear and transparent gels which are preferred for applications where reenterability is of primary importance. [Those compounds having solubility parameters between about 8.3 and 8.9 do impart a degree of opaqueness to the resulting gel with the lower values generally providing a higher degree of cloudiness or opaqueness in the gel. However, all] *All* the polyurethane gels according to this invention are soft with a low tear strength, and these properties are maintained over time to provide desirable reenterable compounds.

It should further be noted that all the suitable plasticizer components according to the invention are low viscosity liquids at room temperature.

The polyurethane gels of the present invention are generally comprised of about 10 to 90 parts by weight of polyurethane, and correspondingly, about 90 to 10 parts by weight of plasticizer. If less than 10 parts of polyurethane are used, the resulting gel will have essentially no tear strength at all, while if less than 10 parts of plasticizer is used, the resulting formulation will not provide the improved properties. The preferred concentration with particular reference to the reclaiming or encapsulating utility comprises about 30 to 40 parts by weight of polyurethane reaction product, about 70 to 60 parts by weight of plasticizer.

If higher solids content grease compatible formulations are desired, the relative proportions would be about 90 to 50 parts by weight of polyurethane and about 10 to 50 parts by weight of plasticizer.

In accordance with the plasticized polyurethanes of the present invention, finely divided solid fillers which are commonly employed in the art as either reinforcing or inert fillers may be utilized. The use of such solid fillers applies mainly to non-reenterable polyurethanes. Conventional fillers include carbon black, asphaltenes, silica, silica-alumina, hydrated silica, zinc oxide, magnesium carbonates, clays, talc, and pulverized reclaimed rubber as well as various mineral fillers which are known in the art. Solid fillers may be employed in the amount of up to about 50 weight percent of the polyurethane.

The present formulations are preferably prepared at the application site by admixing the resin system with the hardener system. Depending on the desired utility, the resin and hardener are utilized in amounts meeting the stoichiometric requirements. The resin component comprises the polyisocyanate or polyurethane prepolymer, and, all or a portion of the plasticizer. The hardener component comprises the polyol, and where applicable, the remaining portion of the plasticizer. The catalyst and optional additives such as fungicides, pigments, anti-oxidants, moisture scavengers, and the like, are generally added to the hardener component. Catalysts are known to those skilled in the art and may comprise, for example, heavy metals utilized in amounts of about 0.1 weight percent of the hardener component.

As noted, the polyurethane gels of the present invention possess the desired properties for a range of utilities, with primary emphasis on utilities such as reenterable encapsulants and reclamants for insulated electrical devices. Initially, these materials are sufficiently fluid to be introduced into the core of a cable or mold surrounding a portion of the cable and to retain their fluidity for a period of time sufficient to fill all the interior free spaces.

The term "reclamation" is used to include the situation wherein the polyurethane gel compositions of the invention are injected into damaged telecommunication or electrical cable to displace any fluid contaminants and restore the cable to its initial condition. As the gel cures, it expands and displaces the contaminants in the damaged cable.

The term "encapsulation" refers to the use of the polyurethane gels of the invention to seal a splice or connection to a cable. In this arrangement, the electrical connections are made to an existing cable, a closure of polyethylene or similar material is made around the connection, and the gel composition is injected into the space between the closure and cable, where it expands and cures to form a moisture resistant seal.

In its reclamining function, the polyurethane will thus displace the liquid penetrants from the free spaces within the cable. In the encapsulation utility, a sheath of polyethylene or other suitable material is placed around a repaired area of the cable. The polyurethane is then placed within the sheath, which acts as a mold for the final outer dimensions of the gel. Thereafter, for either application, a stable gel forms within a reasonable period of time to provide a seal against penetration of water and other fluid materials or contaminants.

Where reenterability is desired, the selected polyurethane provides a gel which is sufficiently soft so as to be readily removed. The insulating properties of these reenterable encapsulant and reclamant compositions are highly improved, particularly with regard to the dissipation factor and volume resistivity of the material. Furthermore, there is no exudation of components used and there is excellent compatibility with materials employed in the cable construction and with polycarbonate connectors. In addition, the instant plasticized polyurethanes can be utilized as hard volume (permanent) encapsulants and for general polyurethane elastomeric uses.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified.

EXAMPLE 1

The following formulations illustrate typical plasticizer/polyurethane gel systems of the invention which are intended for use as reenterable reclamants or encapsulants.

| Resin system | A | B | C | D |
|---|---|---|---|---|
| polymethylene polyphenyl isocyanate (1) | 23.8 | 23.8 | 23.8 | 3.0 |
| castor oil (2) | 2.3 | — | 2.3 | 1.8 |
| diundecyl phthalate | 12.9 | 76.2 | — | 45.2 |
| ditridecyl adipate | — | — | 12.9 | — |
| **Hardener system** | **E** | **F** | **G** | **H** |
| hydroxyl terminated polybutadiene (3) | 32.0 | 32.0 | 32.0 | 13.4 |
| castor oil (2) | 2.9 | 5.8 | 2.9 | 1.8 |

-continued

| | | | | |
|---|---|---|---|---|
| diundecyl phthalate | 65.1 | 62.2 | 65.1 | 34.8 |

(1) PAPI 901 from Upjohn
(2) DB Oil from CasChem. Inc.
(3) Poly-BD R45-HT from Arco Chemicals The following polyurethane gels were then prepared by mixing Resin Systems A,B,C, and D with Hardener Systems E,F,G, and H, respectively. After curing, each of these formulations were found to be soft, clear gels which are eminently suitable for use in applications such as the reclamation or encapsulation of telecommunication cable when a reenterable formulation is desirable.

EXAMPLE 2

The following formulations were then prepared by mixing the following components together and allowing the mixture to cure.

| | I | J | K |
|---|---|---|---|
| polymethylene polyphenyl isocyanate | 5.0 | 5.5 | 4.3 |
| castor oil (2) | — | 5.3 | — |
| hydroxyl terminated polybutadiene (3) | 45.0 | 29.2 | — |
| ditridecyl adipate | 50.0 | — | — |
| diisodecyl phthalate | — | 60.0 | 65.0 |
| polyoxypropylene diol (4) | — | — | 30.7 |

(1) PAPI 901 from Upjohn.
(2) DB Oil from CasChem, Inc.
(3) Poly-BD R45-HT from Arco Chemicals.
(4) PPG-2025 from Union Carbide.

These formulations were also found to be soft, clear, gels, which also would be suitable for reenterable repair applications.

EXAMPLE 3

The following polymer system was prepared:

| Components | Parts |
|---|---|
| polymethylene polyphenyl isocyanate (1) | 13.6 |
| castor oil (2) | 13.3 |
| hydroxyl terminated polybutadiene (3) | 73.1 |

(1) PAPI 901 from Upjohn.
(2) DB Oil from CasChem, Inc.
(3) Poly-BD R45-HT from Arco Chemicals.

Then, 65 parts of this polymer system was mixed with 35 parts of the following plasticizers to prepare the designated polyurethane formulations.

| Plasticizer | Formulation |
|---|---|
| ditridecyl adipate | L |
| diocyl adipate | M |
| diundecyl phthalate | N |
| 6:7 mixture of dioctyl adipate:mineral oil | O |
| 2:1 mixture of diisodecyl phthalate:mineral oil | P |

Dioctyl adipate has a total solubility parameter of [9.05,] *8.91*, which is outside the scope of the invention. Thus it was used in formulation M as a comparative example. The mineral oil extenders of formulations [S and T] *O and P* were also used to illustrate comparative examples of plasticizer materials which are outside of the scope of the invention.

To determine the suitability of the above formulations for grease compatibility, the formulations were cured on FLEXGEL cable filler and, after curing, the weight change of the formulation was measured. Compatible formulations show a weight gain, which indicates that the grease is taken into the formulation.

Alternately, incompatible formulations show a weight loss which indicates an exudation or separation of the extender or plasticizer from the gel. Test results are shown below in Table 2.

As a further means of grease compatibility, an electrical conductor was coated with FLEXGEL cable filler and encapsulated with the above formulations. After the formulations cured, the conductor was pulled out of the polyurethane. The force necessary to separate the conductor from the polyurethane was measured and is also listed below in Table 2.

TABLE 2

| | Test Results | |
|---|---|---|
| Formulation | % Weight Change | Pull-out Force (Lbs) |
| L | +0.4 | 4.5 |
| M | −1.1 | 4.1 |
| N | +0.6 | 6.3 |
| O | −5.0 | 1.8 |
| P | −4.5 | 2.0 |

It is evident from the preceding table that plasticizers having a total solubility parameter between about 9.1 and 9.7 [or between about 8.3 and 8.9] are grease compatible, whereas compounds having other solubility parameters are not.

EXAMPLE 4

The following formulation was prepared:

| Component | Parts |
|---|---|
| polymethylene polyphenylisocyanate (1) | 4.8 |
| castor oil (2) | 4.6 |
| hydroxyl terminated polybutadiene (3) | 25.6 |
| glyceryl tri(acetyl ricinoleate) | 65 |

(1) PAPI 901 from Upjohn.
(2) DB Oil from CasChem, Inc.
(3) Poly-BD R45-HT from Arco Chemicals.

This formulation was then tested for weight change and conductor pullout as described above. Results were:

| % Weight change on various cable fillers: | |
|---|---|
| FLEXGEL | +5.5 |
| PEPJ | +1.6 |
| PJ | +0.5 |

Coated Conductor pull-out 1.0 lbs

This shows that the ricinoleate plasticizer imparts the highest degree of compatibility with a variety of commonly encountered cable fillers or greases to the formulation. Other ricinoleates having total solubility parameters within the above disclosed ranges should also perform similarly.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new and desire to secure by Letters Patent is:

1. A polyurethane gel composition comprising about 10 to 90 parts by weight of the liquid reaction product of an organic polyisocyanate and a polyol in the presence of about 90 to 10 parts by weight of a ricinoleate plasticizer compound having a total solubility parameter of [between about 8.3 and 8.9 or] between about 9.1 and 9.7.

2. The composition of claim 1 wherein the liquid reaction product comprises about 30 to 40 parts by weight, and ricinoleate plasticizer compound comprises about 70 to 60 parts by weight.

3. The composition of claim 1 wherein said isocyanate compound is selected from the group consisting of aliphatic, cycloaliphatic, and aromatic polyisocyanates.

4. The composition of claim 3 wherein said isocyanate compound is polymethylene polyphenylisocyanate or methylene diisocyanate.

5. The composition of claim 1 wherein said organic polyisocyanate is a polyisocyanate prepolymer prepared by reacting an excess of a polyisocyanate compound with a polyol.

6. The composition of claim 1 wherein said polyol is selected from the group consisting of castor oil, polyether polyols, hydroxyl-bearing homopolymers of dienes, hydroxyl-bearing copolymers of dienes, amine based polyols, polymeric polyols, and mixtures thereof.

7. The composition of claim 6 wherein said polyol is a hydroxyl terminated polybutadiene.

8. The composition of claim 1 wherein said ricinoleate plasticizer compound is glyceryl tri(acetyl ricinoleate).

9. A polyurethane gel composition comprising the liquid reaction product of an organic polyisocyanate compound and a polyol in the presence of a ricinoleate plasticizer compound having a total solubility parameter of [between about 8.3 or 8.9 or] between 9.1 and 9.7, the liquid reaction product compound being present in a range of from about 30 to 40 parts by weight and the ricinoleate plasticizer being present in range from about 70 to 60 parts by weight.

10. A polyurethane gel composition comprising the liquid reaction product of a polyisocyanate prepolymer and a polyol in the presence of a ricinoleate plasticizer compound having a total solubility parameter of [between about 8.3 and 8.9 or] between about 9.1 and 9.7, the liquid reaction product being present in the range from about 10 to 50 parts by weight and the ricinoleate plasticizer compound being present in a range of about 90 to 50 parts by weight.

11. The gel composition of claim 10 wherein the liquid reaction product is present in the range of from about 30 to 40 parts by weight and the ricinoleate plasticizer compound is glyceryl tri(acetyl ricinoleate) and is present in a range of about 70 to 60 parts by weight.

12. A polyurethane compositions comprising about 59 to 90 parts of the liquid reaction product of an organic polyisocyanate and a polyol in the presence of about 50 to 10 parts of a ricinoleate plasticizer compound having a total solubility parameter of [between about 8.3 and 8.9 or] between about 9.1 and 9.7.

13. The composition of claim 12 wherein said ricinoleate plasticizer compound is glyceryl tri(acetyl ricinoleate).

*14. A polyurethane gel composition comprising about 10 to 90 parts by weight of the liquid reaction product of an organic polyisocyanate and a polyol having an equivalent weight above 250 in the presence of about 90 to 10 parts by weight of a mixture of ricinoleate plasticizer compounds, said mixture having a total solubility parameter of between about 9.1 to 9.7.*

* * * * *